April 11, 1961  M. P. HIGGINS, SR  2,979,199
POTATO SEPARATOR
Filed June 3, 1957  3 Sheets-Sheet 1
FIG. 1.
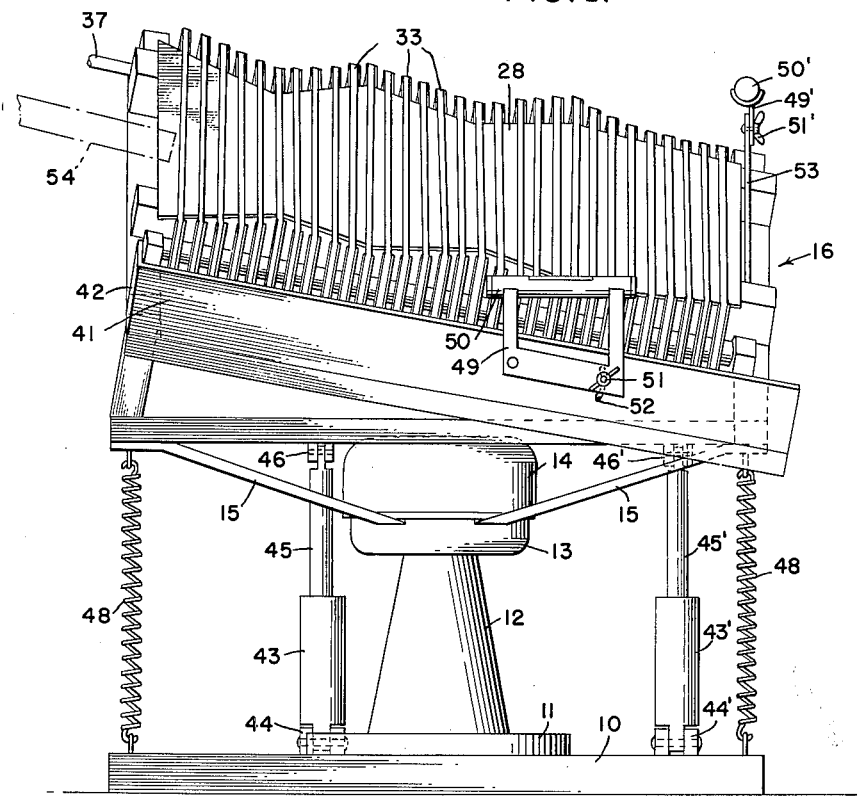
FIG. 2.
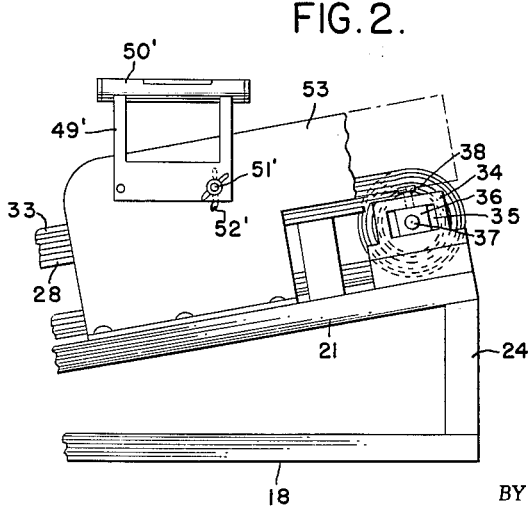
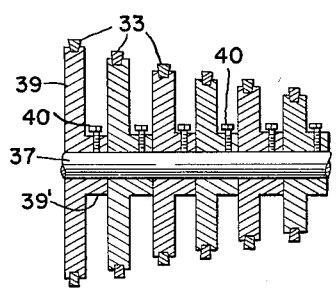
FIG. 6.
INVENTOR
MILFORD P. HIGGINS SR.
BY *Garvey & Garvey*
ATTORNEYS

INVENTOR
MILFORD P. HIGGINS SR.

BY Garvey & Garvey
ATTORNEYS

April 11, 1961 M. P. HIGGINS, SR 2,979,199
POTATO SEPARATOR
Filed June 3, 1957 3 Sheets-Sheet 3

INVENTOR
MILFORD P. HIGGINS SR.
BY *Garvey & Garvey*
ATTORNEYS

United States Patent Office

2,979,199
Patented Apr. 11, 1961

2,979,199
POTATO SEPARATOR
Milford P. Higgins, Sr., P.O. Box 1, Westfield, Maine
Filed June 3, 1957, Ser. No. 663,190
6 Claims. (Cl. 209—114)

This invention relates to a machine for automatically separating potatoes from foreign substances, subsequent to the mechanical harvesting of the potatoes and has for an object the separation of potatoes from rocks and other extraneous material by means of a system of movable belts onto which the harvested potatoes are fed, the belts moving upwardly at a predetermined incline to convey the foreign matter away from the potatoes, at the same time permitting the potatoes to gravitate to a collection point.

Other objects of the invention are to provide a potato separator of the character described in which the inclination of the movable belts is such that the forces of gravity overcome the low frictional forces holding the potatoes on the belts; to provide a separator in which adjacent belts are run at different speeds to effect accurate separation; to provide a system of inclined belts, the angle of inclination of which is adjustable for the particular size and shape of potatoes being separated and to compensate for the differences in terrain on which the separator is located.

Other objects of the invention will be manifest from the following description of the present preferred forms of the invention, taken in connection with the accompanying drawings, wherein:

Fig. 1 is a side elevational view of a potato separator constructed in accordance with the present invention;

Fig. 2 is a fragmentary end elevational view of the same, portions thereof being broken away to disclose details of construction;

Fig. 6 is a fragmentary sectional view of the drive shaft and drive pulleys forming a part of the present invention;

Figure 3:
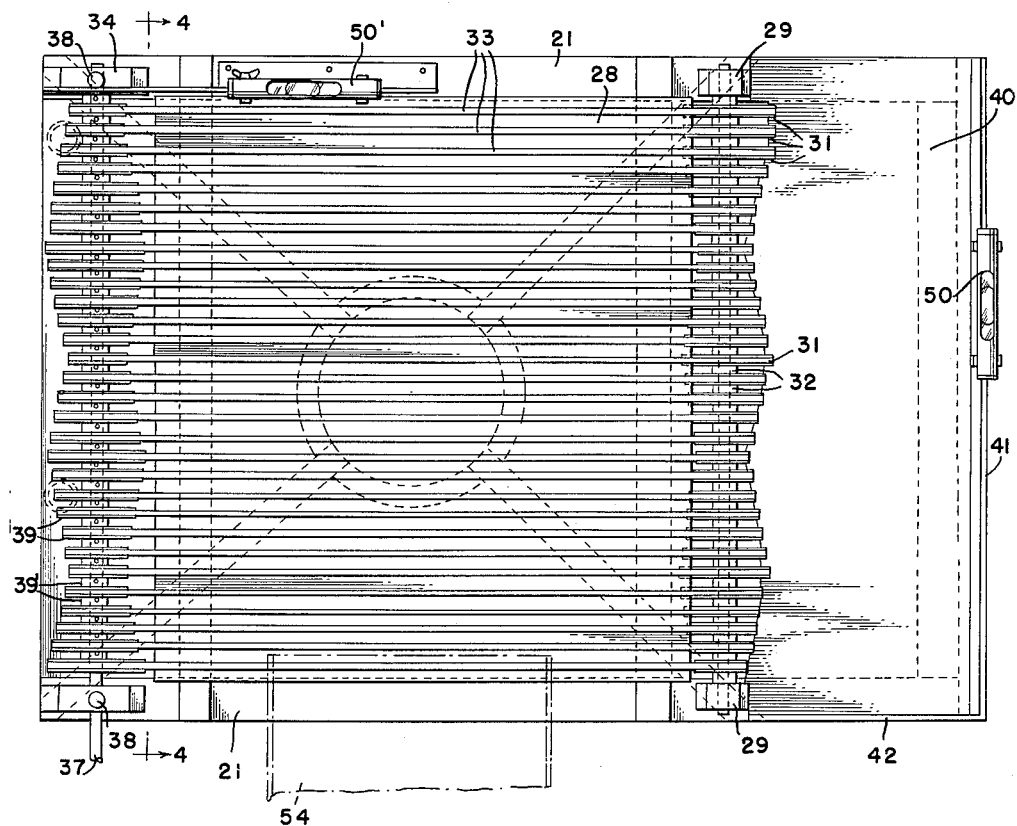
Fig. 3 is a top plan view of the same.
Figure 7:
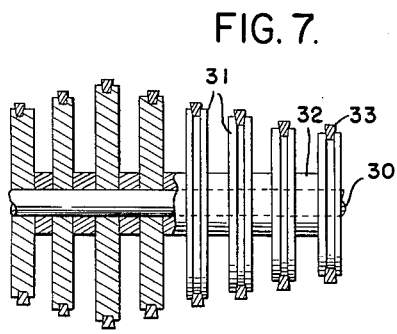
Fig. 7 is a fragmentary plan view partly in section of the idler shaft and idler pulleys forming a part of the present invention.

Referring now in greater detail to the drawings, the device of the present invention includes a support 10 on which a base 11 is suitably mounted. Fixed in any suitable manner to base 11 is a support post 12, the upper terminal of which is enlarged to provide a ball 13. A socket or cap 14 is swivelly mounted on ball 13. A plurality of arms or braces 15 extend radially from socket 14 for supporting the separator bed generally designated 16.

Figure 5:
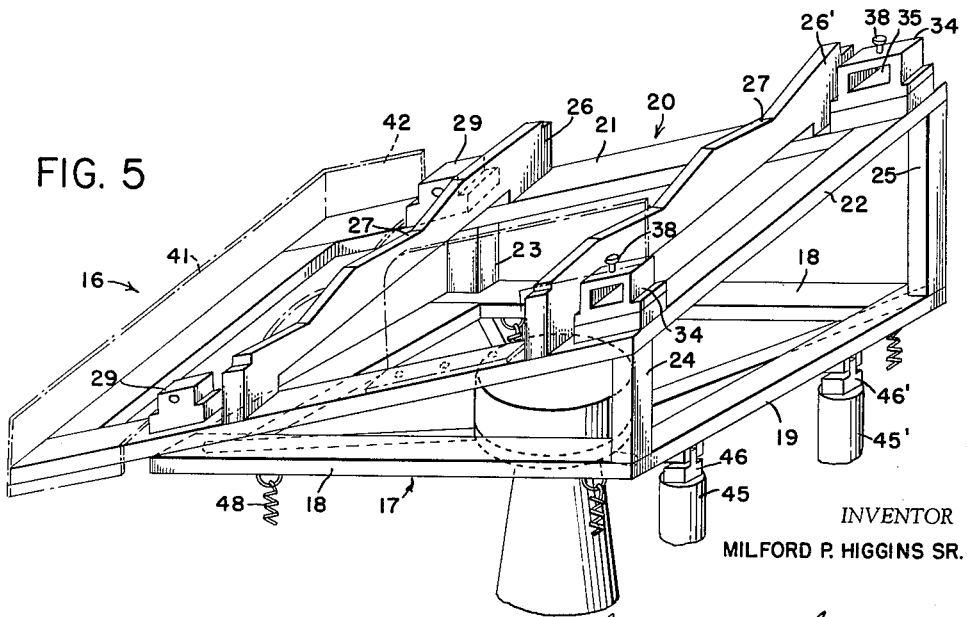
Fig. 5 is a perspective view of the separator bed per se.

As shown to advantage in Fig. 5, bed 16 includes a lower rectangular frame 17 comprising longitudinal members 18, spaced at their terminals by cross members 19. A second rectangular frame 20 of substantially the same dimensions as frame 17, is mounted superjacent frame 17, one corner thereof being in contiguous engagement with a corner of frame 17. Frame 20 includes longitudinal members 21, the terminals of which are spaced by cross members 22. The remaining three corners of frame 20 are spaced from the corresponding corners of frame 17 by posts 23, 24 and 25, which posts are of varying height. By means of this construction, frame 20 is on an incline and canted to one side with respect to frame 17.

Intermediate the upper and lower margins of frame 20 are a pair of spaced, transverse braces 26 and 26', the upper edges of which are undulated as indicated at 27 and 27', the undulations of the two braces being in inverse relation. An undulated plate 28, preferably of one-piece construction, is suitably mounted on bed 16 between braces 26 and 26' and complements the undulated upper edges 27 and 27' thereof, for reasons which will be hereinafter more fully set out.

Mounted on longitudinal members 21 between brace 26 and the lower terminal of frame 20, are a pair of bearing blocks 29 in facing relationship to each other and adapted to receive the terminals of an idler shaft 30. A plurality of pulleys 31 are loosely mounted on shaft 30, adjacent pulleys being spaced by washers 32. Pulleys 31 are of varying diameter and may range anywhere from two inches to more than twenty inches in diameter, depending on the shape of the potatoes. A V belt 33 is trained over each pulley, thereby providing a plurality of endless belts spaced from each other and extending longitudinally of bed 16. A second pair of bearing blocks 34 is mounted on frame 20 at the upper corners thereof, adjacent brace 26', each block having a longitudinal slot 35 adapted for the reception of drive shaft bearings 36 in which the terminals of a drive shaft 37 are rotatably mounted. As shown in Fig. 2, a setscrew 38 affords slidable adjustment of the bearing 36 and shaft 37 in a well known manner, to take up slack in the belts. Shaft 37 is rotated from any suitable source of power and is provided with a plurality of driven pulleys 39 having hubs 39' fixed to shaft 37 by setscrews 40. Hubs 39' additionally serve to space adjacent pulleys. Pulleys 39 also range in size from two inches to more than twenty inches in diameter. V belts 33 extending longitudinally of the bed 16 from pulleys 31 are trained over pulleys 39 so that upon rotation of shaft 37, the upper run of the belts moves upwardly from pulleys 31 to pulleys 39. Since pulleys 31 and 39 are of varying diameter, belts 33 will move at different rates of speed and upon the introduction of the matter to be separated, will be depressed to an extent limited by the undulated surface of plate 28. This arrangement of parts enables foreign matter to be conveyed up the incline on the belts while the low frictional quality of the potatoes allows the latter to gravitate onto a receiving plate 40 adjacent pulleys 31. Guard rails for the plate are provided at 41 and 42.

In order to adjust the angularity of bed 16, there is provided a pair of light, hydraulic cylinders 43 and 43' pivotally connected at 44 and 44' to support 10. Cylinders 43 and 43' include pistons 45 and 45', the upper terminals of which are pivotally connected at 46 and 46' to cross piece 19 of frame 17. Cylinders 43 and 43' are spaced apart and are independently operated by conventional actuating means through hydraulic lines 47 and 47'. Stabilizing spiral springs 48 extend from points adjacent the four corners of frame 17 to support 10.

Mounted on guard rail 41 is a U shaped bracket 49 which supports a spirit level 50. Bracket 49 includes an adjustable thumb screw 51, movable in an arcuate slot 52 in guard rail 41 for maintaining level 50 in a horizontal plane. A second spirit level 50' is supported by a U shaped bracket 49' carried by a level support 53 mounted on longitudinal member 21 of frame 17, adjacent level 50' being disposed at a right angle to level 50. Adjustment of level 50' is effected by thumb screw 51' movable in arcuate slot 52' of support 53. Levels 50 and 50' are adjusted to the proper angle and affords visual means indicating at all times, whether the separator is in proper adjustment.

For feeding the material to be separated to the device of the present invention, there is provided a chute 54 which is located above and at one side of the belt system, as shown in Fig. 3. This chute drops the potatoes and extraneous material onto the belts at a point approximately midway of the run of the belts.

In use, the present separator may be stationarily mounted or carried by a potato harvester. For both uses, the bed must first be adjusted so that belts 33 are inclined and canted to produce accurate separation. This adjustment will vary with the particular shape and size of the potatoes being harvested. To effect this adjustment, either or both cylinders 43 and 43' are actuated to raise or lower pistons 45 and 45' to incline and cant bed 16 to any desired position. After this has been done, spirit levels 50 and 50' are adjusted to a horizontal plane to insure that the bed will be retained in this angular position.

After this adjustment has been made, drive shaft 37 is actuated to rotate pulleys 39 and move the upper run of belts 33 at different rates of speed from idler pulleys 31 to drive pulleys 39. The material to be separated is then fed onto the belts from chute 54 and the weight thereof depresses the belts towards undulated plate 28. Belts 33 in turn assume the undulated appearance of plate 28 thereby effecting a certain agitating action of the potatoes and extraneous matter. The rocks, sod, etc. comprising the extraneous material is held in frictional engagement with one or more belts 33 and is conveyed upwardly to pulleys 39 where it is dumped. On the other hand, the low frictional qualities of the moist outer surface of the potatoes, in conjunction with the inclination of the separator bed permits the force of gravity to overcome the frictional forces holding the potatoes on the belts. Consequently the potatoes move downwardly on the belt towards receiving plate 40 and, by virtue of the canted position of upper frame 20, roll transversely of the belts, away from chute 54 and upon rolling off the separator, fall into a sack or other suitable receptacle. In practice it has been found that optimum results are obtained if adjacent belts are spaced not more than one-fourth inch apart and the belts are not moved rapidly.

When the potato separator of the present invention is to be carried by a tractor or harvester, it is necessary that the levels 50 and 50' lie in horizontal planes at all times. Therefore, in the event that the separator is moved uphill, downhill, or on the side of a hill, the separator must be adjusted to compensate for the difference in terrain. This is done by actuating cylinders 43 and 43', preferably by buttons or other suitable means within the tractor or harvester, to adjust the position of bed 16 until levels 50 and 50' are once again in horizontal planes.

Figure 8:
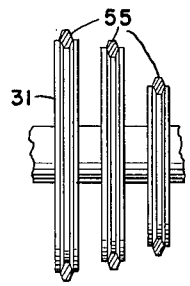
Fig. 8 is a fragmentary plan view showing to advantage a modified form of conveyor belt.
Figure 4:
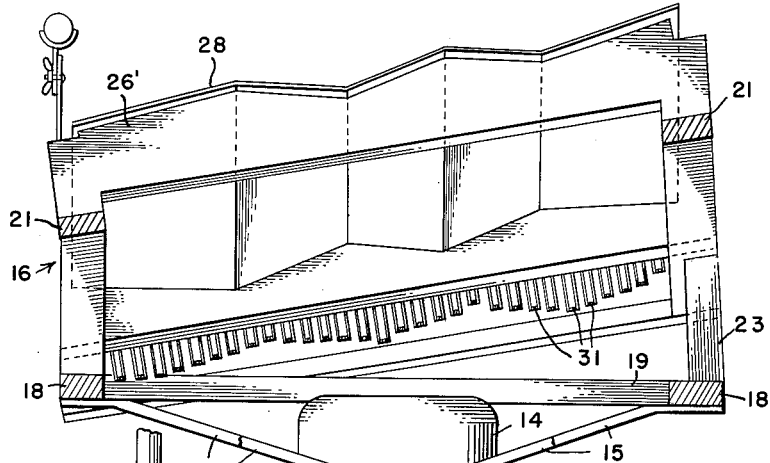
Fig. 4 is a sectional view taken along the lines 4—4 of Fig. 3, looking in the direction of the arrows and with endless belts omitted.

In Fig. 8, there is fragmentarily shown a modified form of the present invention wherein a belt 55 of diamond-shape cross section is employed in lieu of the V belt shown in the preferred form of this invention. This type of belt affords a minimum frictional engagement of the material-contacting surface of the belt with the potatoes and allows them to very readily gravitate to the collection point.

While the device of the present invention has been shown and described as intended for the separation of potatoes from extraneous material, it is to be understood that various other materials having different frictional qualities may be separated in the same manner. Various changes may be made in the invention, without departing from the spirit and scope of the claims hereto appended.

What I claim is:

1. Apparatus for separating potatoes from extraneous substances, subsequent to the potato harvesting cycle, including a supporting frame, a separator assembly carried by the frame, the assembly comprising a bed of parallelly arranged belts adapted to operate in the same direction, at variable speeds, for conveying the extraneous material over one terminal of the bed, the bed being disposed at an inclination to permit the potatoes to gravitate over the opposite terminal of the bed, and an undulated plate mounted on the bed subjacent the top run of belts, to effect agitation of the potatoes and extraneous material when the belt is traveling under load.

2. Apparatus for separating potatoes from extraneous substances, a subsequent to the potato harvesting cycle, including a supporting frame, and a separator assembly carried by the frame, the assembly comprising a bed of parallelly arranged belts adapted to operate in the same direction, at variable speeds, for conveying the extraneous material over one terminal of the bed, the assembly further including a driven shaft equipped with multiple pulleys of varying diameters, secured to the shaft, the belts being trained over the pulleys of the driven shaft at one end of the assembly, and an idler shaft mounted in the opposite end of the assembly and equipped with idler pulleys of varying diameters over which the belts are trained, each belt being driven by a pulley on the drive shaft and over a pulley of different diameter on the idler shaft, the bed being inclined to permit gravitation of the potatoes over the opposite terminal of the bed.

3. Apparatus for separating potatoes from extraneous substances, subsequent to the potato harvesting cycle, including a supporting frame, a separator assembly carried by the frame, the assembly comprising a bed of endless belts located side by side, adapted for the reception of harvested potatoes transversely of the belts approximately midway the run of the latter, the belts being inclined and canted to permit the potatoes to gravitate over one terminal of the bed, the surface of each belt of the bed being in a different plane from the surfaces of the other belts to permit undulation of the bed, under load, to agitate the potatoes and extraneous materials during movement over the bed.

4. Apparatus for separating potatoes from extraneous substances, subsequent to the potato harvesting cycle, including a supporting frame, and a separator assembly carried by the frame comprising a driven shaft and an idler shaft positioned at opposite ends of the frame and equipped with pulleys over which belts are trained, each pulley of the driven shaft being of a different diameter from its corresponding pulley of the idler shaft to effect driving said shafts at variable speeds and to carry extraneous materials upwardly for expulsion over one terminal of the assembly, the supporting frame being disposed at an inclination to permit gravitation of the potatoes over the other terminal of the assembly.

5. Apparatus for separating potatoes from extraneous substances subsequent to the potato harvesting cycle, including a separator assembly embodying a bed of belts adapted to operate in the same direction at variable speeds, and in different planes, for conveying extraneous materials over one terminal of the bed, the bed being disposed at an inclination and canted to permit the potatoes to gravitate over the opposite terminal of the bed.

6. In combination with the potato harvester, apparatus mounted on the harvester, for separating potatoes from extraneous substances subsequent to the potato harvesting cycle, including a separator assembly embodying a bed of belts adapted to operate in the same direction, at variable speeds and in different planes, for conveying the extraneous materials over one terminal of the bed, the bed being disposed at an inclination to permit the potatoes to gravitate over the opposite terminal of the bed, means included in said apparatus for adjusting the separator assembly to compensate for differences in terrain over which the harvester is operated, and spirit levels strategically mounted on the assembly and adjustable to permit the levels to be retained in a horizontal plane.

(References on following page)

References Cited in the file of this patent

UNITED STATES PATENTS

| | | | |
|---|---|---|---|
| 343,999 | Lucas | June 22, | 1886 |
| 659,719 | Gibbs | Aug. 28, | 1900 |
| 1,296,383 | Grey | Mar. 4, | 1919 |
| 1,353,059 | Meyer | Sept. 14, | 1920 |
| 1,523,389 | Beythan | Jan. 20, | 1925 |
| 1,552,366 | Wade et al. | Sept. 1, | 1925 |
| 1,895,268 | Silver | Jan. 24, | 1933 |
| 2,361,034 | Kenitz | Oct. 24, | 1944 |
| 2,547,473 | Klem | Apr. 3, | 1951 |
| 2,577,565 | Bradley | Dec. 4, | 1951 |
| 2,769,539 | Packman | Nov. 6, | 1956 |
| 2,827,645 | Miller | Mar. 25, | 1958 |

FOREIGN PATENTS

| | | | |
|---|---|---|---|
| 948,000 | France | Jan. 24, | 1949 |
| 960,481 | France | Oct. 24, | 1949 |
| 734,944 | Great Britain | Aug. 10, | 1955 |